United States Patent Office 2,975,942
Patented Mar. 21, 1961

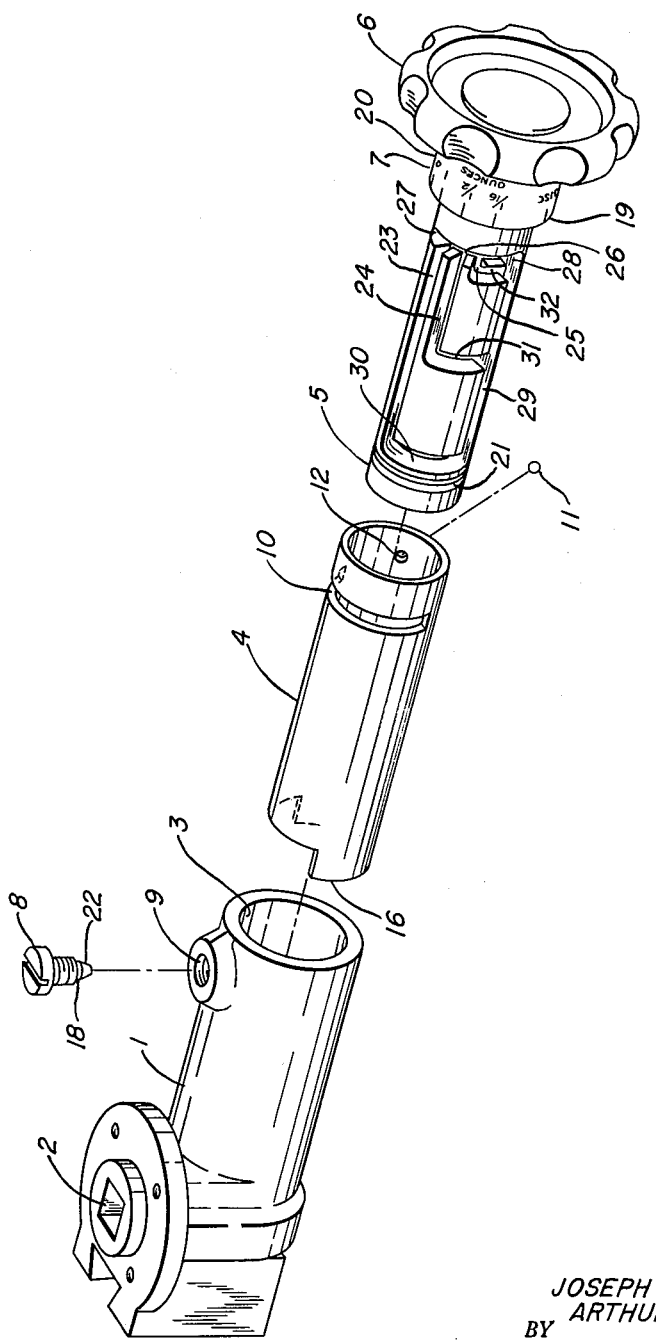

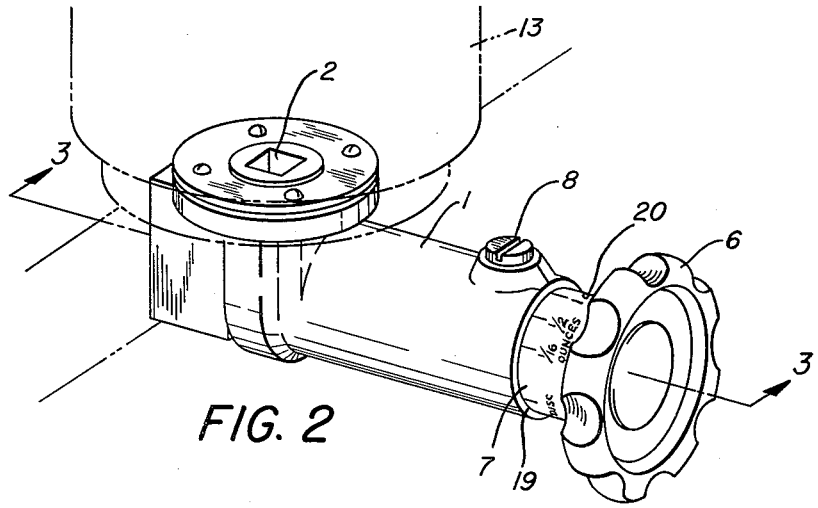
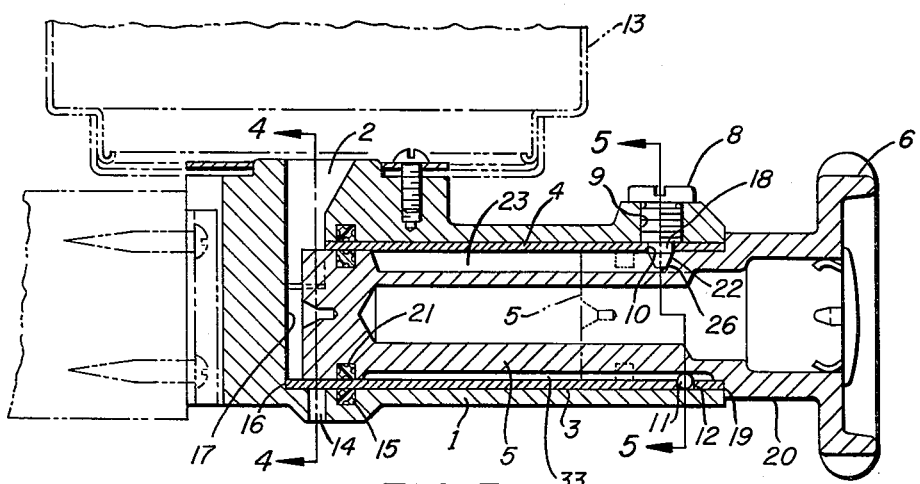
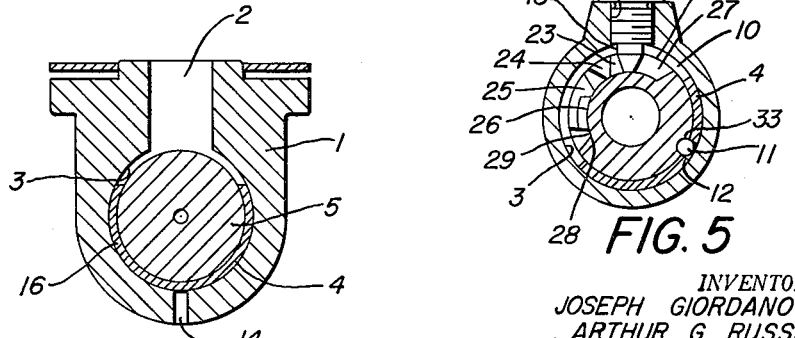

2,975,942
METERING DISPENSING VALVE

Joseph Giordano, Chicago, Ill., and Arthur G. Russell, Bristol, Conn., assignors to The Sherwin-Williams Company, Cleveland, Ohio, a corporation of Ohio Filed Dec. 15, 1958, Ser. No. 780,548

6 Claims. (Cl. 222—380)

This invention relates generally to valves, and more particularly to dispensing valves characterized by their ability to deliver measured quantities of material from a supply source.

That portion of the coatings industry primarily concerned with the custom blending of colors for trade sales purposes has recently undergone a rather marked change in the methods of marketing such coating compositions. Heretofore, a paint store has found it mandatory to maintain a large stock of colors packed in the usual containers and ready for delivery to a customer on demand. The trend toward pastel shades and tints in recent years has greatly multiplied the stock or inventory which must be maintained by a dealer to best service his trade. This has led to the development of very complex tinting and shading systems involving tinting colors, and one or several base paints and formulas stipulating the quantities of such colors as may be necessarily added to a base paint to produce a desired shade. Installation of such a system, while greatly alleviating the problem of large inventory, has, nevertheless, given rise to many other problems, to the solution of one of which the present invention is primarily directed.

As currently and increasingly practiced, custom colors are being produced by adding to a base white paint very carefully controlled amounts of one or more tinting colors. Since these tinting colors are generally used in amounts of two ounces or less for each color per gallon of custom blended paint, it can be readily observed that the very substantial part of the inventory maintained by the dealer is composed of white paint with or without a few base paints and the balance is a relatively small amount of vari-colored tinting bases. These so-called tinting bases are conveniently maintained in vessels equipped with dispensing devices capable of dispensing measured quantities of the several tinting bases as may be demanded by a particular formula.

It is a principal object of this invention, therefore, to provide a metering dispensing valve of a particular type which is especially adapted for dispensing relatively small, accurately measured quantities of material from a supply vessel.

Other objects of the invention will appear as the description proceeds.

To the accomplishment of the foregoing and related ends, said invention, then, consists of the means hereinafter fully described and particularly pointed out in the appended claims, the following description and annexed drawing setting forth in detail certain illustrative embodiments of the invention, such disclosed means constituting, however, but a few of the various forms in which the principle of this invention may be employed.

Broadly stated, this invention comprises the provision of a metering dispensing valve comprising a housing having an inlet and an outlet, a barrel valve sleeve rotatably mounted within said housing for selective opening and closing said inlet and outlet, respectively, a piston telescopically mounted within said sleeve, means coacting between the piston and the housing for limiting the axial displacement of said piston to any of a plurality of preselected displacements, and means coacting between said piston and said sleeve for rotating said sleeve.

In the annexed drawings,

Fig. 1 is an exploded view showing the principal parts of a metering dispensing valve in accordance with this invention.

Fig. 2 is an illustration of a metering dispensing valve in accordance with the present invention.

Fig. 3 is a cross-sectional view taken on the line 3—3 of Fig. 2.

Fig. 4 is a cross-sectional view taken on the line 4—4 shown in Fig. 3.

Fig. 5 is likewise a cross-sectional view taken transversely on the line 5—5 of Fig. 3.

Referring more particularly to Fig. 1, there is here shown a housing 1 which may be an aluminum casting having an inlet port 2 therein and a cylindrical bore 3 adapted to receive a barrel valve sleeve 4 and to permit rotation thereof about its axis within the bore 3. The sleeve 4 may be of brass. Telescopically mounted within the sleeve 4 is a piston 5 which may conveniently be fitted with suitable handle means 6 and indexing means 7. This part may also be of aluminum. Suitable means, such as pin 8, are provided to coact with the housing 1 by being threaded therethrough at 9 with the piston 5 for limiting the axial displacement of said piston. The pin 8 may also serve the additional function as shown in the embodiment of retaining the sleeve 4 in fixed axial relationship by coacting with a partial circumferential slot 10 in the wall of said sleeve 4. There is also provided means coacting between the piston 5 and the sleeve 4 for rotating said sleeve 4 as the piston 5 is rotated by means of the handle 6. These means may include a detent or ball 11 which rests in a suitable hole 12 in the wall of the barrel valve sleeve 4, said ball 11 being retained in the hole 12 in the assembly by the housing 1. Although it is not shown in Fig. 1, the ball 11, which has a diameter greater than the wall thickness of the sleeve 4, engages a groove 33 on the back side of the piston 5, which permits axial movement of the piston 5 within the sleeve 4, but insures that the sleeve 4 cannot be rotated independently of the piston 5.

Fig. 2 illustrates one embodiment of the present invention with a supply vessel 13 shown in dotted lines communicating with the inlet 2 of the dispensing valve.

Figs. 3, 4 and 5 show in greater detail a preferred embodiment of the present invention. There is here shown in cross-section a housing 1 having an inlet port 2 and an outlet port 14, and a cylindrical bore 3 through the housing 1 normal to the inlet and outlet path and intercepting it. Rotatably mounted within the bore 3 is a barrel valve sleeve 4 which is desirably sealed with suitable sealing means 15, such as, for example, an O-ring. In the operating position, the innermost extremity of the sleeve 4 abuts against a machined surface 17 of the housing 1. To provide for communication between the inlet 2 and the interior of the sleeve 4 a segment of the tube 4 is cut away so that the end of the sleeve 4 is shaped substantially as shown in Fig. 1. Convenient means for retaining the sleeve 4 within the housing 1 include the slot 10 in the sleeve 4, and that portion 18 of the pin 8 which traverses the sleeve 4. The sleeve 4 is so sized as to permit rotation within the housing 1, and the slot 10 is so sized as to permit rotation of the sleeve 4 by the shoulder 18 of the pin 8 while at the same time maintaining a fixed axial relationship between the sleeve 4 and the housing 1.

Telescopically mounted within the sleeve 4 is a piston 5 desirably fitted with handle means 6 at its outer end and a shoulder 19. The hub portion 20 may conveniently carry an indexing scale 7 as shown in Fig. 2. At its innermost end, the piston 5 desirably carries fluid sealing means 21, such as a piston ring or O-ring.

The means coacting between the piston and the housing for limiting the axial displacement of the piston to any of a plurality of pre-selected displacements includes the pin 8 attached to the housing 1, the innermost projection 22 of which engages a grooved system in the surface of the piston 5. Referring to Fig. 1 where a grooving system is shown, there are provided a plurality of longitudinal grooves 23, 24 and 25. The outer extremities of the grooves 23, 24 and 25 communicate with a common circumferential groove 26, partially encircling the piston 5. One extremity of the circumferential groove 26 indicated at 27 provides an "off" position such that when the handle 6 is turned so that the index 7 registers "off," the piston 5 is restrained by the extension 27 of the circumferential groove 26 against axial movement. Other means coacting between the piston and the housing for limiting axial displacement, e.g., as by adapting the pin to move with the piston in a groove or grooves supported by the housing, may be employed.

The opposite extremity 28 of the circumferential groove 26 communicates with a longitudinal groove 29. As shown in Fig. 1, the longitudinal grooves 23, 24 and 25 are of different lengths, corresponding respectively, to a maximum volume such as 1 ounce, an intermediate volume, such as ½ ounce, and a minimum volume, such as 1/16 ounce. The innermost extremities of the grooves 23, 24 and 25 communicate respectively with partial circumferential grooves 30, 31 and 32 which communicate in turn at correspondingly spaced intervals with the common longitudinal groove 29. More than the indicated three grooves can be supplied, if desired, as well as different volumes.

Opposite to the metering groove system above described is an independent longitudinal groove 33 in the piston 5. The purpose of the groove 33 is to serve as a part of means coacting with the barrel valve sleeve 4 to prevent rotation of the piston 5 relative to the sleeve 4. A convenient form of preventing such relative rotation comprises a ball 11 seated in a hole 12 in the sleeve 4, which ball 11 has a diameter greater than the thickness of the wall of the sleeve 4 enabling the upper section of the ball 11 to extend into and engage the groove 33 in the piston 5. Thus, when the handle 6 is rotated to the right or left, the sleeve 4 is simultaneously rotated to the right or to the left. Axial displacement of the piston 5 with respect to the sleeve 4 is, however, permitted by the means here described.

In Fig. 3, the dotted section shows the piston 5 at its fully retracted position in the groove 23.

The mode of operation of the preferred embodiment of the present invention is as follows. When the valve of this invention is suitably affixed to the bottom of a supply vessel 13 containing a fluid to be dispensed, the fluid flows freely into the inlet 2 but is prevented from exiting through the outlet 14 by the sleeve 4 when in the position shown in Fig. 3. The operator, then proceeding according to a formula, selects a desired amount of fluid to be dispensed with the indexing means 7 about the collar 20 of the piston 5. This selection, made while the piston is in the fully inserted position as shown in Fig. 3, lines up the extension 22 of the pin 8 with a proper longitudinal groove 23, 24 or 25. Simultaneously, the barrel valve sleeve 4 turns with the piston 5 as this selection is made, without, however, closing off communication between the inlet 2 and the interior of the barrel valve sleeve 4. With the selection thus made, and communication between the supply vessel 13 and the interior of the barrel valve sleeve 4 maintained, the piston 5 is withdrawn from the housing 1 to the extent permitted by the longitudinal groove 23, 24 or 25, as the case may be. This operation permits the interior of the barrel valve sleeve 4 to become filled with the liquid to be dispensed in a volume which is very accurately controlled by the metering system described. The handle 6 of the piston 5 is then rotated to the right, causing the projection 22 of the pin 8 to travel through the corresponding circumferential groove 30, 31 or 32, as the case may be, which circumferential grooves prevent any axial displacement of the piston 5 which would change the volume within the barrel valve sleeve 4. The rotation of the handle 6 is continued until engagement of the pin extension 22 with the longitudinal groove 29 is established. Simultaneously with the rotation of the handle 6 to the right to bring the projection 22 of the pin 8 into engagement with the groove 29, the barrel valve sleeve 4 has also been rotated to a sufficient degree that the inlet port 2 is sealed with the remaining section of the cylinder 16, and communication between the outlet port 14 and the sleeve 4 is established. Then by telescoping the piston 5 into the sleeve 4 until the shoulder 19 abuts the end of the housing 1, and/or the projection 22 of the pin 8 has traversed the allowable axial dimension of the groove 29, the contents of the valve sleeve 4 are discharged through the opening 14 into a suitable container below, not shown.

While for clarity of explanation, certain embodiments of this invention have been shown and described, it is to be understood that this invention is capable of many modifications and changes in its construction and arrangement and some parts may be employed with the conjoint use of other parts and without departing from the spirit and scope of this invention.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A metering dispensing valve comprising a housing having an inlet and an outlet, a barrel valve sleeve rotatably mounted within said housing for selective opening and closing said inlet and outlet respectively, a piston telescopically mounted within said sleeve, means adapted to coact between the piston and the housing for selectively limiting the axial displacement of said piston to any of a plurality of predetermined axial displacements, and means coacting between said piston and said sleeve to cause the sleeve to follow the piston when the latter is rotated about its axis.

2. A metering dispensing valve in accordance with claim 1 in which the means coacting between the piston and the housing includes a pin adapted to be guided in groove means of fixed length.

3. A metering dispensing valve in accordance with claim 1 in which the means coacting between the piston and the housing includes a pin extending from the exterior of the housing through an opening in said barrel valve sleeve, and a plurality of longitudinally disposed grooves in said piston engageable with the inner extremity of said pin, said longitudinal grooves having different lengths corresponding to different displacements of said piston.

4. A metering dispensing valve in accordance with claim 1 in which the means coacting between the piston and the housing includes a pin extending from the exterior of the housing through an opening in said barrel valve sleeve and a plurality of longitudinal disposed grooves in said piston engageable with the inner extremity of said pin, said longitudinal grooves having different lengths corresponding to different displacements of said piston, each of said longitudinal grooves terminating at its outer extremity in a common circumferentially disposed groove, and at its inner extremity to a circumferential groove communicating with a common longitudinal groove.

5. A metering dispensing valve in accordance with claim 1 in which the means coacting between the piston and the barrel valve sleeve for rotating said sleeve includes a small detent communicating between the inner wall of said sleeve and engaging a longitudinal groove disposed in said piston and adapted to permit only axial movement of said piston with respect to said sleeve.

6. A metering dispensing valve comprising a housing having an inlet and an outlet, a barrel valve sleeve rotatably mounted within said housing for selective opening and closing of said inlet and outlet respectively, a piston telescopically mounted within said sleeve, means adapted to coact between the piston and the housing for selectively limiting the axial displacement of said piston to any of a plurality of predetermined axial displacements, means coacting between the piston and said sleeve to cause the sleeve to follow the piston when the latter is rotated about its axis, and means adapted to coact between the piston and the housing for controlling the angular displacement of said piston and said sleeve.

References Cited in the file of this patent

UNITED STATES PATENTS

| | | |
|---|---|---|
| 2,096,461 | Mane et al. | Oct. 19, 1937 |
| 2,119,463 | Lewis | May 31, 1938 |
| 2,464,030 | Engstrom | Mar. 8, 1949 |
| 2,150,576 | Herbold | June 6, 1950 |